(12) United States Patent
Kernkamp et al.

(10) Patent No.: US 8,505,590 B2
(45) Date of Patent: *Aug. 13, 2013

(54) CONTAINER FOR STORING AND UNLOADING BULK MATERIAL

(75) Inventors: Michiel Kernkamp, Lausanne (CH); Peter Jaggy, La Tour-de-Peilz (CH)

(73) Assignee: Nestec S.A., Vevey (CH)

( * ) Notice: Subject to any disclaimer, the term of this patent is extended or adjusted under 35 U.S.C. 154(b) by 761 days.

This patent is subject to a terminal disclaimer.

(21) Appl. No.: 12/666,118

(22) PCT Filed: Jun. 23, 2008

(86) PCT No.: PCT/EP2008/057961
§ 371 (c)(1), (2), (4) Date: Dec. 22, 2009

(87) PCT Pub. No.: WO2009/000810
PCT Pub. Date: Dec. 31, 2008

(65) Prior Publication Data
US 2010/0186597 A1 Jul. 29, 2010

(30) Foreign Application Priority Data

Jun. 28, 2007 (EP) ..................... 07111228

(51) Int. Cl.
*B65D 6/00* (2006.01)
*B65D 25/16* (2006.01)
*B65D 25/08* (2006.01)
(52) U.S. Cl.
USPC ............. 141/18; 141/330; 141/331; 141/364; 222/81; 222/129

(58) Field of Classification Search
USPC .................. 99/289 R, 295; 141/18, 329, 330, 141/331, 364; 222/80, 81, 129, 521; 206/222, 206/219; 426/106
See application file for complete search history.

(56) References Cited

U.S. PATENT DOCUMENTS 2,767,744 A * 10/1956 Beerman ........................ 141/319
3,171,449 A * 3/1965 Ellms et al. .................... 141/330
3,938,639 A 2/1976 Birrell
4,576,313 A * 3/1986 Smith et al. ...................... 222/81

(Continued)

FOREIGN PATENT DOCUMENTS

EP 0343090 11/1989
EP 0350128 1/1990

(Continued)

OTHER PUBLICATIONS

Written Opinion, PCT/EP2008/057961, mailed Sep. 29, 2008, 5 pages.

(Continued)

*Primary Examiner* — Reginald L Alexander
(74) *Attorney, Agent, or Firm* — K&L Gates LLP

(57) ABSTRACT

The present invention relates to container (1) for storing and unloading bulk material comprising:—a vessel (2) presenting a closed end (3) and an opened end (4),—a hopper (5) placed inside the vessel (2) and tapering to a discharge outlet in direction of the vessel opened end (4),—a tearable membrane (7) closing the hopper (5) and the vessel (2). The invention relates also to a tank to be refilled by said container and a method for refilling the tank with the container.

18 Claims, 3 Drawing Sheets

(56) References Cited

U.S. PATENT DOCUMENTS

| | | | |
|---|---|---|---|
| 4,834,261 A | * | 5/1989 | Brdlik .......................... 141/332 |
| 5,131,566 A | * | 7/1992 | Bavegems ...................... 222/80 |
| 5,941,380 A | * | 8/1999 | Rothman ...................... 206/222 |
| 2003/0074868 A1 | | 4/2003 | Yasouka et al. |

FOREIGN PATENT DOCUMENTS

| | | |
|---|---|---|
| EP | 0408217 | 1/1991 |
| EP | 0434168 | 6/1991 |
| EP | 0442433 | 8/1991 |
| EP | 1453018 | 9/2004 |
| JP | 59-074292 | 4/1984 |
| JP | 63-187272 | 8/1988 |
| JP | 08-179610 | 7/1996 |
| JP | 2000-336807 | 12/2000 |
| WO | 02/081308 | 10/2002 |

OTHER PUBLICATIONS

International Search Report, PCT/EP2008/057961, mailed Sep. 29, 2008, 4 pages.

* cited by examiner

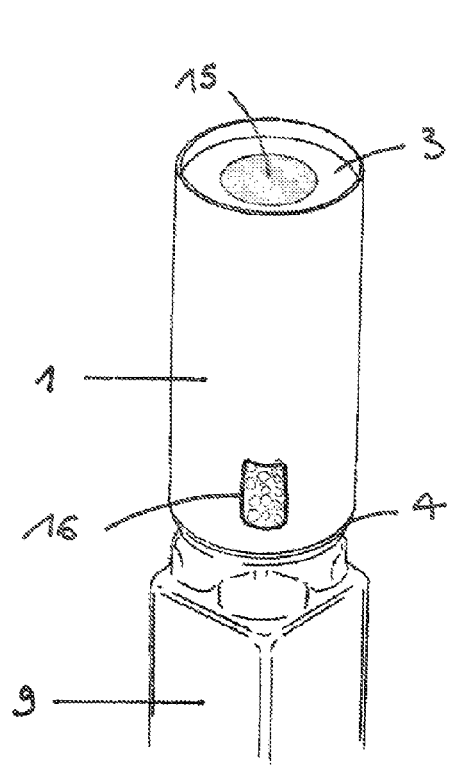
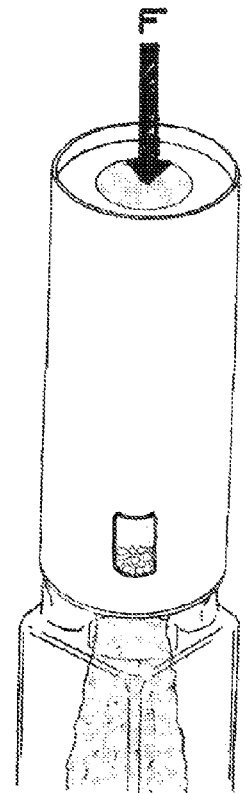
Figure 3a                    Figure 4a
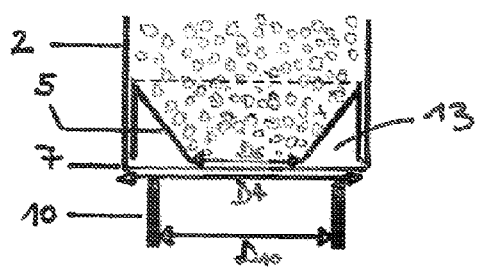
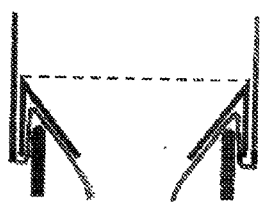
Figure 3b                    Figure 4b

CONTAINER FOR STORING AND UNLOADING BULK MATERIAL

The present invention relates to a container for storing and unloading a bulk material in a tank. More particularly, the invention relates to a container for refilling a coffee powder tank.

Various automated beverage machines for making hot or cold beverage products are known in the art. In a conventional beverage machine, a metered amount of water soluble beverage powder, stored in powder refillable tank, and a metered amount of hot or cold water, supplied from a water source, is mixed in a mixing chamber to produce a beverage or food, which is then dispensed into a cup and served. The refilling of tanks consists in pouring the powder from a disposable powder bag type package for example gusset bags with zippers that allow the bag to be re-opened and closed. During this operation, the operator encounters several problems.

There can be a significant loss of powder during the transfer of the powder from the refilling bag to the tank to be refilled. As a consequence a certain quantity of powder is lost and there is also a dusting of the coffee machine by the powder that has fallen out of the tank. A periodic cleaning of the machine is therefore necessary to avoid a dirty looking machine as well as to avoid hygiene problems.

Another problem is caused by the mixing of the powder with air when it flows from one container to the other: it can create a problem of hygiene due to possible contamination with the outside environment, especially, when air and water sensitive powders are used. Moreover, air can generally cause a loss of aroma of the transferred coffee powder. Lastly, the dry powder can be a highly hygroscopic material, thereby leading to the formation of lumps and cakes that prevent gravity flow and transport of the powder inside the machine.

There also exists problems relative to the disposable containers used to refill the coffee machine tanks. One problem is due to the fact that the machines are often calibrated so that they provide the best coffee beverage with a specific coffee powder. An error in the type of coffee powder that is refilled in the machine could lead to a reduced quality beverage disappointing the consumer. It would be appreciable to provide containers specifically adapted to a type of machine so as to guarantee an improved beverage dispensing. An other problem is the necessity to provide the consumers with light weight disposable containers for a more convenient shopping.

Therefore, there is need for a satisfactory container, especially for use as a small food or beverage dispensing machine for an office or home that would allow the refilling of such a machine with a flowable substance from a convenient removable package with a high level of cleanliness and with limited contact with atmosphere. In particular there does not exist a powder refillable container that can be adapted in a quick, clean and effective manner to a tank or directly in the machine.

There is also a need for a container of which form provides simultaneously easy handling, easy storing, compactness and optimized storing volume.

The present invention now resolves these deficiencies.

In a first aspect, the invention relates to a container for storing and unloading bulk material comprising:
  a vessel presenting a closed end and an opened end,
  a hopper placed inside the vessel and tapering to a discharge outlet in direction of the vessel opened end,
  a tearable membrane closing the hopper and the vessel.

The present invention provides a container for a bulk material that can be either under the form of particles like granulates, granules, grains, powders and the like or under the form of a liquid, a paste or a gel in a closed manner in order to store, transport and sell this bulk material. In addition to storing such products the container allows easy unloading of the bulk material from the container to a machine or the tank designed to be filled by the bulk material.

The container of the present invention comprises mainly a vessel with a closed end and an opened end; its function is to receive and store the bulk material. Any shape of vessel could be used. The section of the vessel can be circular, oval, square, or the like. The form and the size of the section can vary along the length of the vessel to provide a better handling of the container or for providing a marketing appeal. In a preferred embodiment of the present invention the vessel is a cylinder presenting a round section or an oval section; these forms enable easy manufacturing, easy storing and easy handling. The vessel can be made of at least a material chosen between: plastic, cardboard paper, aluminium or a combination and/or laminate of such materials. The preferred material is a laminate of sheets of paper, polyethylene, aluminium, polyethylene terephthalate and polyethylene according to this order. These materials are preferred as they lead to a low weight vessel, yet any other materials could be used to make the vessel. These materials should present a good humidity barrier and, optionally, good oxygen barrier. Depending on the nature of the bulk material that is intended to be stored inside, these materials can also present UV rays- and light-barrier properties. In a special embodiment the closed end of the vessel can be at least partially transparent by using for example a transparent plastic. Such a transparent end enables the control of the level of the remaining bulk material inside the container when this one is used. This transparent part of the vessel can also be placed near the opened end of the vessel with the same purpose. Preferably the opened end of the vessel presents a flange. This flange is useful for fixing the tearable membrane of the container.

The container of the present invention comprises a hopper which function is to enable the unloading of the bulk material from the vessel outside of the container. This hopper or funnel-shaped receptacle enables the bulk material to fall by gravity into a receptacle placed at the opened end of the vessel. According to the invention, the hopper is totally placed inside the vessel and directed so that it tapers in direction of the vessel opened end; then its tapered end, corresponding to the hopper discharge outlet, faces the opened end of the vessel. Due to the fact that the hopper is totally placed inside the vessel volume, its tapered end is either at most in the same plane as the opened end of the vessel or recessed inside the vessel volume. On account of the relative positioning of the hopper and the vessel, a groove extends between the wall of the hopper and the wall of the vessel along all the periphery of the hopper discharge outlet.

The hopper is usually positioned inside the vessel near the opened end of the vessel in order to let the most important volume of the vessel for storing the bulk material. The hopper can be fixed in the vessel by heat-sealing, by high frequency adhesion, with an adhesive or the like. The hopper can present an outer skirt presenting the same form as the vessel, said skirt being able to fit inside the vessel and to position the hopper inside the vessel, for example by leaning on it. This skirt can present a stopping edge able to lean on the edge of the opened end of the vessel in order to avoid the hopper to slide.

The hopper can present any form. It usually presents a circular form but it can also presents a specific form similar to the opening of the tank to be refilled with the container (like a square, a star, a heart and the like); this specific form can avoid the refilling of the tank with a product that is not adapted for. According to a preferred embodiment, the hopper has a frusto-conical shape.

The tapering angle of the hopper may depend from the nature and the granulometry of the bulk material. For a hydrosoluble coffee powder, the hopper usually presents a tapering angle $\alpha$ of at least 10° and at most 80°, preferably comprised between 15 and 50°, the tapering angle corresponding to the angle between the hopper tapering wall and the hopper central axis. Generally, for the storage of powders, the finer or denser is the powder, the steeper is the tapering angle (around 20°) and the wider is the hopper discharge outlet. And the bigger are the powder particles or lighter is the powder, the flatter is the tapering angle (around 45°) and the smaller is the hopper discharge outlet.

In a preferred embodiment of the present invention, the hopper comprises a bulk material guiding device coupled to the tapered end of the hopper. Said guiding device may be for example a cylinder. According to this embodiment the outlet of the guiding device forms the hopper discharge outlet in place of the hopper tapered end. Then, when this preferred embodiment is implemented, the terms "hopper discharge outlet" mean the guiding device outlet. According to the invention, the whole of the hopper and its bulk material guiding device must be in the volume of the vessel and the guiding device outlet is closed by the tearable membrane.

The sections of the hopper tapered end and the vessel opened end present generally symmetrical forms and have the same centre of symmetry. In the preferred embodiment of the present invention, the hopper tapered end presents a circular section and the vessel opened end presents a circular section too, both circular sections presenting the same centre. The hopper is preferably made of plastic like high-density polyethylene polypropylene.

Lastly the container of the present invention comprises a tearable membrane that closes simultaneously the hopper and the vessel. The tearable membrane closes the hopper inside the vessel volume. The tearable membrane is in contact with the tapered end of the hopper or the discharge outlet of the bulk material guiding device according to the above preferred embodiment. The tearable membrane aims at closing the container when it stores the bulk material. Preferably, the membrane is tearable by contact pressure on its surface. Such a tearable function can be obtained by making small perforations through the membrane that would enable the tear of the membrane. Then the membrane can present tear lines. It has been proved that when tear lines are straight lines intersecting at the centre of the membrane better opening of the membrane is obtained and better unloading of the bulk material is possible. Yet any other form of tear lines can be used. The membrane may be made of any material that is tearable, this can be at least a material chosen between: paper, aluminium, polymer sheets and combination thereof. The preferred membrane is a laminate of sheets of paper, polyethylene, aluminium and polyethylene according to this order.

According to a first mode, the discharge outlet section of the hopper can be substantially in the plane of the opened end section of the vessel. This common plane is usually perpendicular to the main axis of the hopper. In the first mode, the tearable membrane closes simultaneously the opened end of the vessel and the discharge outlet (either the hopper tapered end or the outlet of the guiding device) placed in the same plane. The membrane is then placed in this specific plane common to the opened end of the vessel and the discharge outlet.

According to a second mode of the present invention, the edge of the discharge outlet of the hopper can be recessed inside the vessel. The edge of the hopper discharge outlet is set back from the vessel opened end. In this second mode, the tearable membrane covers the edge of the discharge outlet of the hopper and is connected to the inner wall of the vessel.

The container may comprise a protection cap above the tearable membrane. This cap enables the protection of the tearable membrane during the transport of the container. This cap can be a peelable cover.

The different elements of the container may be connected by permanent or detachable means. Permanent means may be designed to be sealing, welding, bonding, non-reversible clipping means or other means. Detachable means may mean a container formed of a threaded portion or equivalent complementary mechanical engagement means on one of the elements of the container which collaborate with a threaded portion or complementary mechanical engagement means belonging to another element of the container.

According to the preferred embodiment of the present invention, the container is filled with coffee powder. Yet, this type of container may be used for the storing and unloading of any other bulk material either in food or non food area, especially material that are sensible to the air and must be transferred from the container to another recipient with limited contact with the air. Food material may be any food concentrate intended to reconstitute a hot or cold, frothy or non-frothy drink. For example, the bulk material may be a powder of soluble milk, coffee, cocoa, tea or a combination thereof. Other powdered foods such as dried mashed potatoes or other dried foods, sauce or gravy powders, soup powders or the like may also be used in this invention. The container of the present invention can also store pharmaceutical compounds or chemical compounds that must be fed in machines with limited contact with air and in a rapid way. Such machines can be packaging machines or process machines.

The filling of the vessel part of the container of the present invention with the bulk material to be stored inside is generally realised on the container of which closed end has not yet been closed but for which all the other elements (hopper, membrane, eventually protection cap) are already present and assembled. Once the bulk material has been filled inside, the vessel is closed in a definitive way at its closed end.

Once the container of the present invention has been used, the protection membrane is pierced to unload the bulk material and the container can no more be used. The container is disposed when it is empty.

According to a specific embodiment, a part of the vessel can be a flexible pouch. This flexible pouch corresponds usually to the closed end of the vessel, whereas the rest of the vessel is rigid for enabling the relative cooperation of the hopper, the vessel and the membrane.

The container of the present invention presents numerous advantages. Due to the fact that the functionalities of the container (the hopper and its position relative to the vessel) are hired inside the vessel, it is possible to choose any shape for the vessel, particularly shapes enabling easy manufacturing and easy storing and easy handling. For the same reason, the container is solid since no component extends out of the vessel and can be broken through manipulation. Moreover the container is compact and its internal space is optimized to store as much as possible of bulk ingredient while limiting the space for the emptying and connection functionality.

Another advantage of the container of the present invention is that it simultaneously enables the storage of a big quantity of bulk ingredient and the rapid emptying of this container through the hopper in an adapted tank. The hopper reduces time for exhausting the material while protecting the material during its transfer.

In a second aspect, the present invention concerns a tank for storing bulk material and susceptible to be refilled by a container as described above, said tank presenting refilling opening with means for piercing the tearable membrane of the container and for cooperating with the hopper of the container. The means for piercing the tearable membrane of the container and for cooperating with the hopper are preferably a conduit presenting an outlet section smaller than the section of the opened end of the container vessel and bigger than the section of the hopper discharge outlet. The outlet section of the tank conduit presents generally a symmetrical form preferably a circular form. It can present a specific form cooperating exactly with the discharge outlet of the hopper to avoid the refilling of the tank with a material that is not adapted for. Due to these relative section differences:

the conduit of the tank can fit into the container vessel opened end when piercing the container membrane and the discharge outlet of the hopper can fit into the conduit of the tank, which enables the bulk material to directly flow from the container through the hopper to the tank without contact with the air.

In one mode the tank can be a simple non disposable jar, the container enabling its refilling. The container is then disposed after it has refilled the jar. So the consumer does not have to rebuy a new non disposable jar: it is a gain for him since the refilling container is less expensive. It pollutes less since the refilling container can be made of recycling materials like paper. Finally the disposable refilling container can be of a light weight.

In another mode, the tank can be the coffee powder tank of a coffee machine. This tank can be removable from the coffee machine or not. Such a tank is useful for avoiding the refilling of the machine with a coffee powder for which the coffee machine is not tuned. The filling of the machine with an other coffee is not possible. It can also be the tank of any other machine using a bulk material.

In a third aspect, the present invention concerns a coffee machine susceptible to be refilled by a container as described above having a dosing unit presenting means for piercing the tearable membrane of the container and for cooperating with the hopper of the container. The means for piercing the tearable membrane of the container and for cooperating with the hopper of the container are preferably a conduit presenting a section smaller than the section of the opened end of the container vessel and bigger than the section of the hopper discharge outlet. The outlet section of the conduit presents generally a symmetrical form preferably a circular form. It can present a specific form cooperating exactly with the tapered end of the hopper to avoid the refilling of the tank with a material that is not adapted for. As for the tank, due to these relative section differences:

the conduit of the coffee machine can fit into the container vessel opened end when piercing the container membrane and the discharge outlet of the hopper can fit into the conduit of the coffee machine to be refilled, which enables the flow of the bulk material from the container to the coffee machine.

In a fourth aspect, the present invention concerns a method for refilling a tank with a container according to the present invention, said tank having a refilling opening presenting means for piercing the tearable membrane of the container and for cooperating with the hopper of the container, comprising the steps of:

positioning the container and the tank refilling opening so that the container tearable membrane faces the tank refilling opening, pushing the container against the tank refilling opening or the tank refilling opening against the container in order to break the container tearable membrane, eventually turning the assembly of the container and the tank so that the bulk material flows by gravity in the tank.

In the first step of the method, the membrane faces the refilling opening of the tank. Usually the container is placed upside down which means that the end of the container with the membrane is the bottom of the container: so the bulk material is gravity oriented to the hopper and the discharge outlet of the hopper inside the container. And in a second step, the operator pushes the container against the refilling opening to break the container tearable membrane. If the container is placed upside down as described above, then the bulk material flows immediately from the container through the pierced membrane inside the tank. Thus, the user can easily perform the refilling operation by hand in a simple movement by turning the container upside down and pushing it against the tank to be refilled. If in the first step the container is not placed upside down against the refilling opening of the tank, then the assembly of the container and the tank must finally be turned so that bulk material can fall in the tank. This last possibility can be preferred when the container is particularly heavy and then when it is difficult to precisely position and push the end of the container against the tank refilling opening; it can be easier to put the empty tank upside down, to position it faced to the container, to push it against the container and then to return the assembly of the tank and the container.

Consequently it is then possible in a single movement to simultaneously open the membrane and to empty the bulk material, which is much appreciated by operators and users.

If the volume of the tank is at least equal to the volume of the container, then all the bulk material flows inside the tank and when it is empty, the container is disposed.

If the volume of the tank is inferior to the volume of the container, which can be the case if the tank is a small receptacle in a coffee machine cooperating with the dosing unit of the coffee machine, then the container can stay in place above the tank and be used as an expansion tank in a following step. In small kitchens, it is appreciated to have a container that is small and compact while providing the storage of an important amount of coffee, properties due to the optimized position of the hopper in the vessel.

In a last aspect, the invention relates to the use of the container according to the present invention to refill a tank or a machine having a refilling opening, said refilling opening presenting means for piercing the tearable membrane of the container and for cooperating with the hopper of the container. The main use of the above container is refilling. Effectively, this container that is preferably made of light and disposable materials enables the consumers to reload either a main non-disposable tank or to directly feed a machine with the bulk material. This use is possible if the tank or the machine to be refilled present a refilling opening that cooperates with the container of the present invention. For this reason, the refilling opening presents means for piercing the tearable membrane of the container and for cooperating with the hopper of the container so that bulk material can fall from the vessel through the hopper and the refilling opening inside the tank or the machine. Preferably these means for piercing the tearable membrane of the container and for cooperating with the hopper of the container is a conduit presenting a section smaller than the section of the opened end of the container vessel and bigger than the section of the hopper discharge outlet.

According to a first mode, the container of the present invention is used for refilling a tank. This tank can be the coffee powder tank of a coffee machine or a non disposable coffee powder jar.

According to a second mode, the container of the present invention is used for directly refilling a coffee machine, for example for a coffee machine that does not comprise a coffee powder tank. In this case, the refilling opening of the coffee machine can directly cooperates with the dosing unit of the coffee machine.

The objects of the present invention present several advantages. The containers according of the present invention enable the refilling of tanks without loss of bulk material outside the tank. Besides the containers avoid the contact of the bulk material with the atmosphere which can be of paramount importance for a material like coffee powder avoiding its loss of aroma or for hygroscopic powder. The containers of the present invention enable the refilling of a tank that present means for cooperating with said container avoiding wrong refilling of a machine tuned to prepare beverages with a specific powder.

BRIEF DESCRIPTION OF THE DRAWINGS

The characteristics and advantages of the invention will be better understood in relation to the figures which follow:

FIGS. 3a and 3b are respectively a perspective and a sectional view of a container and a tank according to the present invention before the refilling of the tank by the container.

FIGS. 4a and 4b are respectively a perspective and a sectional view of a container and a tank according to the present invention during the refilling of the tank by the container.

DETAILED DESCRIPTION OF THE DRAWINGS

Figure 1:
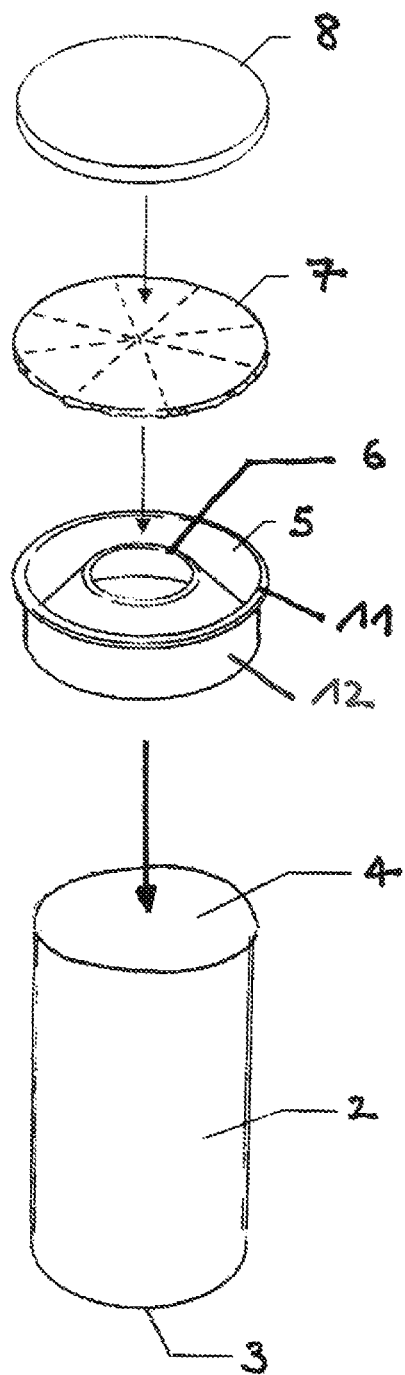
FIG. 1 depicts an exploded view of the container according to the present invention.

FIG. 1 illustrates a container according to the present invention. It comprises a vessel 2 that is here a rigid cylinder presenting a closed end 3 and an opened end 4.

According to a specific mode, that is not illustrated, the length of the vessel can be reduced and the closed end of the vessel can be closed by a flexible pouch enabling the storage of a big amount of bulk material inside the container. This type of flexible pouch is especially adapted for storing and dispensing soluble food powders for the preparation of beverages in beverage dispensers. When this type of flexible pouch is placed in a beverage dispenser, the flexible part is hooked in the dispenser whereas the rigid part is used for the connection to beverage preparation side part of the machine. This rigid part presents the same features as the hereunder described container.

As illustrated in FIG. 1, the container comprises a hopper 5 positioned inside the vessel volume and near to the opened end 4 of the vessel 2. Said hopper extends on the whole vessel section and tapers to a discharge outlet 6 that faces the opened end 4 of the vessel. The hopper is attached to a circular skirt or outside flange 12 which presents the same form as the internal wall of the vessel 2. This skirt fits inside the vessel 2 and helps positioning the hopper in the vessel. This skirt presents a stopping edge 11 that abuts against the vessel opened end edge and avoid the hopper sliding along the vessel wall. Due to the fact that the hopper is placed inside the vessel volume with its discharge outlet facing the vessel opened end, a groove 13 extends between the hopper tapering wall and the vessel wall along all the periphery of the hopper discharge outlet.

A tearable membrane 7 is fixed above the opened end 4 of the vessel 2 and above the hopper discharge outlet 6 closing simultaneously the vessel opened end and the hopper tapered end. The tearable membrane can be fixed according to different variants either to the vessel or to the hopper stopping edge as further detailed in FIGS. 2a to 2c.

Lastly a protective cap 8 is placed above the tearable membrane 7 in order to prevent the tearing of the membrane before the container is used for unloading its content.

Figure 2A:
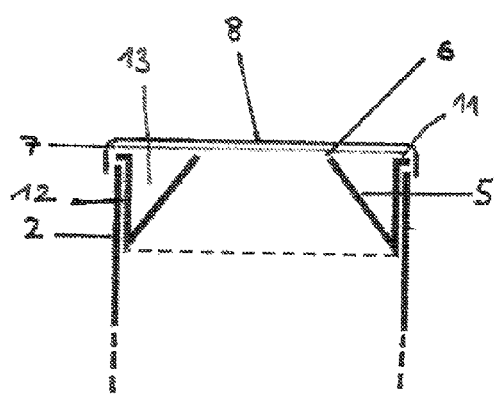
FIGS. 2a to 2c are sectional views of one end of the container according to the first mode of the present invention.
Figure 2C:
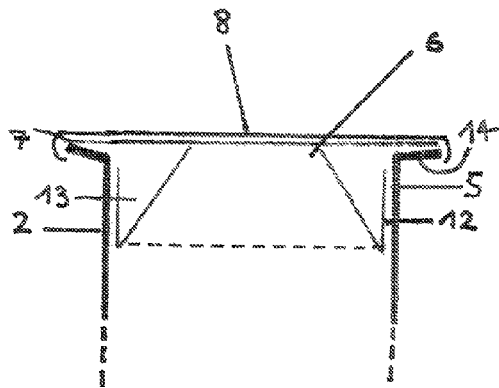
Figure 2B:
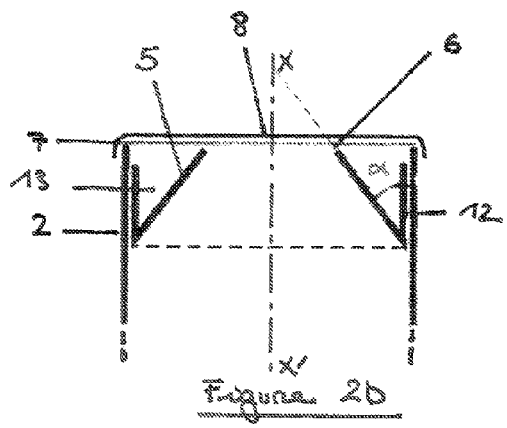

FIGS. 2a to 2c give a good understanding of the relative position of the different elements of the container when this one is closed and of the different ways to fix the tearable membrane. It appears clearly that the hopper 5 is placed inside the vessel volume 2 so that the section of the hopper discharge outlet 6 is in the same plane as the opened end 4 of the vessel 2. For this reason, the membrane 7 placed at the opened end 4 of the vessel 2 simultaneously closes the vessel 2 and the discharge outlet 6. The protection cap 8 protects the tearable membrane 7. The skirt 12 on which is attached the larger end of the hopper 5 enables locking the position of the hopper inside the vessel. This skirt 12 fits exactly inside the vessel wall.

On FIG. 2a, the skirt 12 presents a stopping edge 11 near the opened end the vessel in order to hook the hopper on the edge of the opened end of the vessel to avoid the hopper to slide. The membrane 7 is fixed on the stopping edge of the hopper.

On FIG. 2b, the skirt 12 of the hopper does not present stopping edge laying on the vessel opened end edge. The membrane is fixed on the edge of the vessel opened end. FIG. 2b supports the definition of the tapering angle α of the hopper corresponding to the angle between the hopper tapering wall and the hopper central axis XX'.

On FIG. 2c, the vessel 2 presents a flange 14 at its opened end edge and the membrane is fixed on this vessel flange 14. It is also possible to use a hopper with a skirt 12 presenting a stopping edge 11 near the opened end the vessel in order to hook the hopper on the edge of the opened end of the vessel; yet said stopping edge must be less long than the flange 14 of the vessel opened end so that the membrane can be fixed on a part of the flange 14 that is not recovered by the hopper stopping edge.

FIGS. 2a to 2c show that the hopper discharge outlet section is substantially in the same plane as the opened end section of the vessel. Then the membrane that is fixed in this plane closes simultaneously the hopper discharge outlet and the vessel opened end.

Figure 2D:
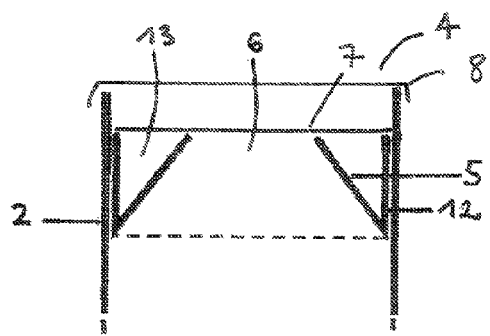
FIG. 2d is a sectional view of one end of the container according to the second mode of the present invention.

FIG. 2d illustrates the second mode of the present invention where the edge of the discharge outlet of the hopper is recessed inside the vessel rather than in the same plane as the opened end of the vessel. The membrane 7 closes the discharge outlet 6 of the hopper and the vessel. It is fixed on the inside wall of the vessel.

Figure 2E:
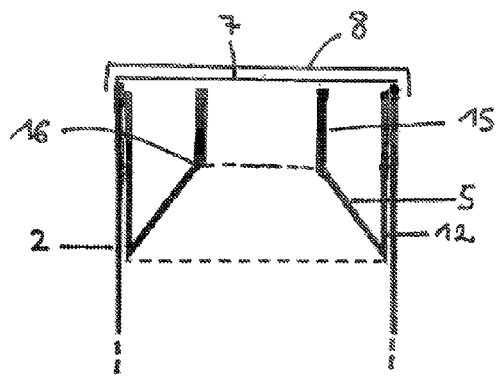
FIG. 2e is a sectional view of one end of the container having a hopper with a guiding device.

FIG. 2e illustrates a container according to the present invention which hopper 5 presents a guiding device 15, here a cylinder, coupled to the tapered end of the hopper. The hopper with its guiding device is totally placed inside the vessel volume and positioned so that the outlet of the guiding device, corresponding to the hopper discharge outlet, is closed by the tearable membrane 7. The membrane closes simultaneously the vessel opened end. This embodiment with the hopper coupled to a guiding device can also be implemented by recessing the whole of the hopper and the guiding device and the membrane inside the vessel as illustrated in FIG. 2d.

In all these different modes and embodiments, it can be seen that the membrane covers simultaneously the hopper discharge outlet 6 and the groove 13 existing between the hopper wall and the vessel wall around all the periphery of the hopper discharge outlet. Due to the membrane, the powder is safely stored. Due to the presence of the groove just under the membrane, the membrane can be torn by the tank refilling opening and the hopper can simultaneously slide inside said tank refilling opening. The contact with air is reduced.

FIGS. 3a, 3b, 4a and 4b illustrate a method for refilling a tank with a container according to the present invention.

FIGS. 3a and 3b illustrate the step where the container 1 according to the present invention is placed upside down above the tank 9 to be refilled. The bulk material inside the container 1 is facing the discharge outlet 6 of the hopper and is retained by the tearable membrane 7. The tank 9 presents a refilling opening presenting means 10 for piercing the tearable membrane 7 of the container and for cooperating with the hopper 5 of the container. These puncture means 10 are a cylinder presenting a diameter $D_{10}$. This diameter is bigger than the diameter $D_6$ of the section of the discharge outlet 6 and smaller than the diameter $D_4$ of the section of the opened end 4 of the vessel 2.

FIGS. 4a and 4b illustrate the step where the container 1 is pushed by a force F against the tank refilling opening. It can be noted that the force F could also be applied by tank against the container. The force F creates a pressure of the puncture means 10 of the tank against the container tearable membrane 7 sufficient to pierce the membrane. As the membrane 7 breaks, the puncture means 10 enter the vessel 2 of the container inside the peripheral groove 13 existing between the hopper tapering wall and the vessel wall and cooperate with the hopper 5. On account of this groove extending all along the periphery of the hopper discharge outlet, the cooperation of the hopper and the cylinder 10 of the tank is very tight. Then the bulk material directly flows from the vessel 2 into the tank without possibility to escape in the air or to let air enters the space between the container and the tank.

The container of FIGS. 3a and 4a presents transparent windows to control the level of the powder in the container during the emptying of the container. This window can be placed in different parts of the container, a window 15 can be present in the closed end of the container or window 16 can be placed in the side wall of the container near its closed end. This latter window 16 is particularly useful when the container is used as an expansion tank of a coffee machine.

As apparent from FIGS. 3b and 4b, the selection of the form and the size of the hopper 5, and then its discharge outlet, and the selection of the form and the size of the refilling opening 10 of the tank 9 avoids the wrong refilling of the tank with a bulk material that is not adapted for.

The invention claimed is:

1. Container for storing and unloading bulk material, the container comprising:
   a vessel having a closed end and an opened end,
   a hopper inside the vessel and tapering to a discharge outlet in a direction of the opened end, the hopper comprising an outer skirt presenting the same form as the vessel, the skirt being able to fit inside the vessel and to position the hopper inside the vessel, the skirt positioned inside the vessel between an inner wall of the vessel and the tapered portion of the hopper, and
   a tearable membrane closing the hopper and the vessel.

2. Container according to claim 1 wherein the vessel is a cylinder.

3. Container according to claim 1 wherein a groove extends between a wall of the hopper and a wall of the vessel along an entire periphery of the discharge outlet.

4. Container according to claim 1 wherein the hopper has a tapering angle of between 15 and 50°.

5. Container according to claim 1 wherein the hopper comprises a bulk material guiding device coupled to the tapered end of the hopper.

6. Container according to claim 1 wherein the edge of the discharge outlet of the hopper is recessed inside the vessel and the tearable membrane covers the discharge outlet of the hopper and is connected to an inner wall of the vessel.

7. Container according to claim 1 wherein the discharge outlet of the hopper is substantially in a same plane as the opened end of the vessel and the tearable membrane covers the discharge outlet of the hopper and the opened end.

8. Container according to the claim 1 wherein the skirt comprises a stopping edge that can be positioned on the edge of the opened end.

9. Container according to claim 1 wherein the tearable membrane is tearable by a contact pressure on its surface.

10. Tank for storing bulk material and capable of being refilled by a container that stores bulk material and comprises a vessel having a closed end and an opened end, a hopper inside the vessel and tapering to a discharge outlet in a direction of the opened end, the hopper comprising an outer skirt presenting the same form as the vessel, the skirt being able to fit inside the vessel and to position the hopper inside the vessel, the skirt positioned inside the vessel between an inner wall of the vessel and the tapered portion of the hopper, and a tearable membrane closing the hopper and the vessel, the tank comprising a refilling opening comprising means for piercing the tearable membrane of the container and for cooperating with the hopper of the container by inserting between the skirt and the tapered portion of the hopper.

11. Tank according to claim 10 where the means for piercing the tearable membrane of the container and for cooperating with the hopper of the container are a conduit having a section that is smaller than the opened end and larger than the discharge outlet.

12. Tank according to claim 10 wherein the tank is a coffee powder tank of a coffee machine.

13. Coffee machine that can be refilled by a container comprising a vessel having a closed end and an opened end, a hopper inside the vessel and tapering to a discharge outlet in a direction of the opened end, the hopper comprising an outer skirt presenting the same form as the vessel, the skirt being able to fit inside the vessel and to position the hopper inside the vessel, the skirt positioned inside the vessel between an inner wall of the vessel and the tapered portion of the hopper, and a tearable membrane closing the hopper and the vessel, the coffee machine having a dosing unit comprising means for piercing the tearable membrane of the container and for cooperating with the hopper of the container by inserting between the skirt and the tapered portion of the hopper.

14. Coffee machine according to claim 13 where the means for piercing the tearable membrane of the container and for cooperating with the hopper of the container is a conduit having a section smaller than the opened end and larger than the discharge outlet.

15. Container for storing and unloading bulk material, the container comprising:
   a vessel having a closed end and an opened end,
   a hopper inside the vessel and tapering to a discharge outlet in a direction of the opened end, a cylinder connected to the tapered portion of the hopper, the cylinder comprising a cylinder outlet that forms the discharge outlet, and the cylinder outlet is substantially in a same plane as the opened end of the vessel, and a tearable membrane closing the hopper and the vessel.

16. Method for refilling a tank with a container for storing and unloading bulk material comprising a vessel having a closed end and an opened end, a hopper inside the vessel and tapering to a discharge outlet in a direction of the opened end, and a tearable membrane closing the hopper and the vessel, the tank having a refilling opening comprising means for piercing the tearable membrane of the container and for cooperating with the hopper of the container, the method comprising the steps of:

positioning an outer skirt of the hopper inside the vessel to position the hopper inside the vessel, the skirt presenting the same form as the vessel and being positioned inside the vessel between an inner wall of the vessel and the tapered portion of the hopper;

positioning the container and the tank refilling opening so that the container tearable membrane faces the tank refilling opening, pushing the container against the tank refilling opening or the tank refilling opening against the container in order to break the container tearable membrane by inserting the refilling opening of the tank between the outer skirt of the hopper and the tapered portion of the hopper, and turning the assembly of the container and the tank so that bulk material flows by gravity into the tank.

17. Method according to claim 16 where the volume of the tank is less than the volume of the container and the container is used as an expansion tank.

18. Container according to claim 1 wherein the skirt comprises a stopping edge that extends laterally, and the stopping edge abuts the opened end of the vessel.

* * * * *